US008565205B2

(12) United States Patent
Ho et al.

(10) Patent No.: US 8,565,205 B2
(45) Date of Patent: Oct. 22, 2013

(54) SPECIFIC ABSORPTION RATE BACKOFF IN POWER HEADROOM REPORT

(75) Inventors: Sai Yiu Duncan Ho, San Diego, CA (US); Valentin Alexandru Gheorghiu, Tokyo (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 13/287,768

(22) Filed: Nov. 2, 2011

(65) Prior Publication Data

US 2012/0147801 A1 Jun. 14, 2012

Related U.S. Application Data

(60) Provisional application No. 61/410,328, filed on Nov. 4, 2010.

(51) Int. Cl.
*H04Q 7/24* (2006.01)
(52) U.S. Cl.
USPC .......................................... 370/338; 370/252
(58) Field of Classification Search
None
See application file for complete search history.

(56) References Cited

U.S. PATENT DOCUMENTS

| 5,524,275 | A | * | 6/1996 | Lindell | 455/117 |
| 2003/0228875 | A1 | | 12/2003 | Alapuranen | |
| 2011/0263216 | A1 | * | 10/2011 | Lee et al. | 455/127.1 |
| 2012/0127933 | A1 | * | 5/2012 | Worrall et al. | 370/329 |
| 2013/0051261 | A1 | * | 2/2013 | Kazmi et al. | 370/252 |

FOREIGN PATENT DOCUMENTS

WO WO2009149023 A1 12/2009

OTHER PUBLICATIONS

International Search Report and Written Opinion—PCT/US2011/059118—ISA/EPO—Jan. 3, 2012.

* cited by examiner

*Primary Examiner* — Duc C Ho
(74) *Attorney, Agent, or Firm* — Fulbright & Jaworski LLP

(57) ABSTRACT

Uplink transmission power adjustment is provided by a mobile device receiving an uplink transmission grant from a serving base station. The mobile device determines a maximum power reduction for uplink transmissions and a SAR-related power reduction. The mobile device compares these values and adjusts transmission power according to the SAR-related power reduction in response to the SAR-related power reduction exceeding the maximum power reduction. A power headroom report is generated when the determined SAR-related power reduction exceeds a previous SAR-related power reduction. This power headroom report is transmitted from the mobile device to the serving base station under various conditions.

36 Claims, 9 Drawing Sheets

SPECIFIC ABSORPTION RATE BACKOFF IN POWER HEADROOM REPORT

CROSS-REFERENCE TO RELATED APPLICATIONS

This application claims the benefit of U.S. Provisional Patent Application No. 61/410,328, entitled, "SPECIFIC ABSORPTION RATE BACKOFF IN POWER HEADROOM REPORT", filed on Nov. 4, 2010, which is expressly incorporated by reference herein in its entirety.

BACKGROUND

1. Field

Aspects of the present disclosure relate generally to wireless communication systems, and more particularly, to power headroom report processing in a wireless network.

2. Background

Wireless communication networks are widely deployed to provide various communication services such as voice, video, packet data, messaging, broadcast, and the like. These wireless networks may be multiple-access networks capable of supporting multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving an uplink transmission grant from a serving base station, determining a maximum power reduction for uplink transmissions at a mobile device, determining a specific absorption rate (SAR)-related power reduction, comparing the maximum power reduction with the SAR-related power reduction, and adjusting transmission power according to the SAR-related power reduction in response to the SAR-related power reduction exceeding the maximum power reduction.

In an additional aspect of the disclosure, an apparatus configured for wireless communication includes means for receiving an uplink transmission grant from a serving base station, means for determining a maximum power reduction for uplink transmissions at a mobile device, means for determining a SAR-related power reduction, means for comparing the maximum power reduction with the SAR-related power reduction, and means for adjusting transmission power according to the SAR-related power reduction in response to the SAR-related power reduction exceeding the maximum power reduction.

In an additional aspect of the disclosure, a computer program product has a non-transitory computer-readable medium having program code recorded thereon. This program code includes code to receive an uplink transmission grant from a serving base station, code to determine a maximum power reduction for uplink transmissions at a mobile device, code to determine a SAR-related power reduction, code to compare the maximum power reduction with the SAR-related power reduction, and code to adjust transmission power according to the SAR-related power reduction in response to the SAR-related power reduction exceeding the maximum power reduction.

In an additional aspect of the disclosure, an apparatus includes at least one processor and a memory coupled to the processor. The processor is configured to receive an uplink transmission grant from a serving base station, to determine a maximum power reduction for uplink transmissions at a mobile device, to determine a SAR-related power reduction, to compare the maximum power reduction with the SAR-related power reduction, and to adjust transmission power according to the SAR-related power reduction in response to the SAR-related power reduction exceeding the maximum power reduction.

DETAILED DESCRIPTION

Figure 1:
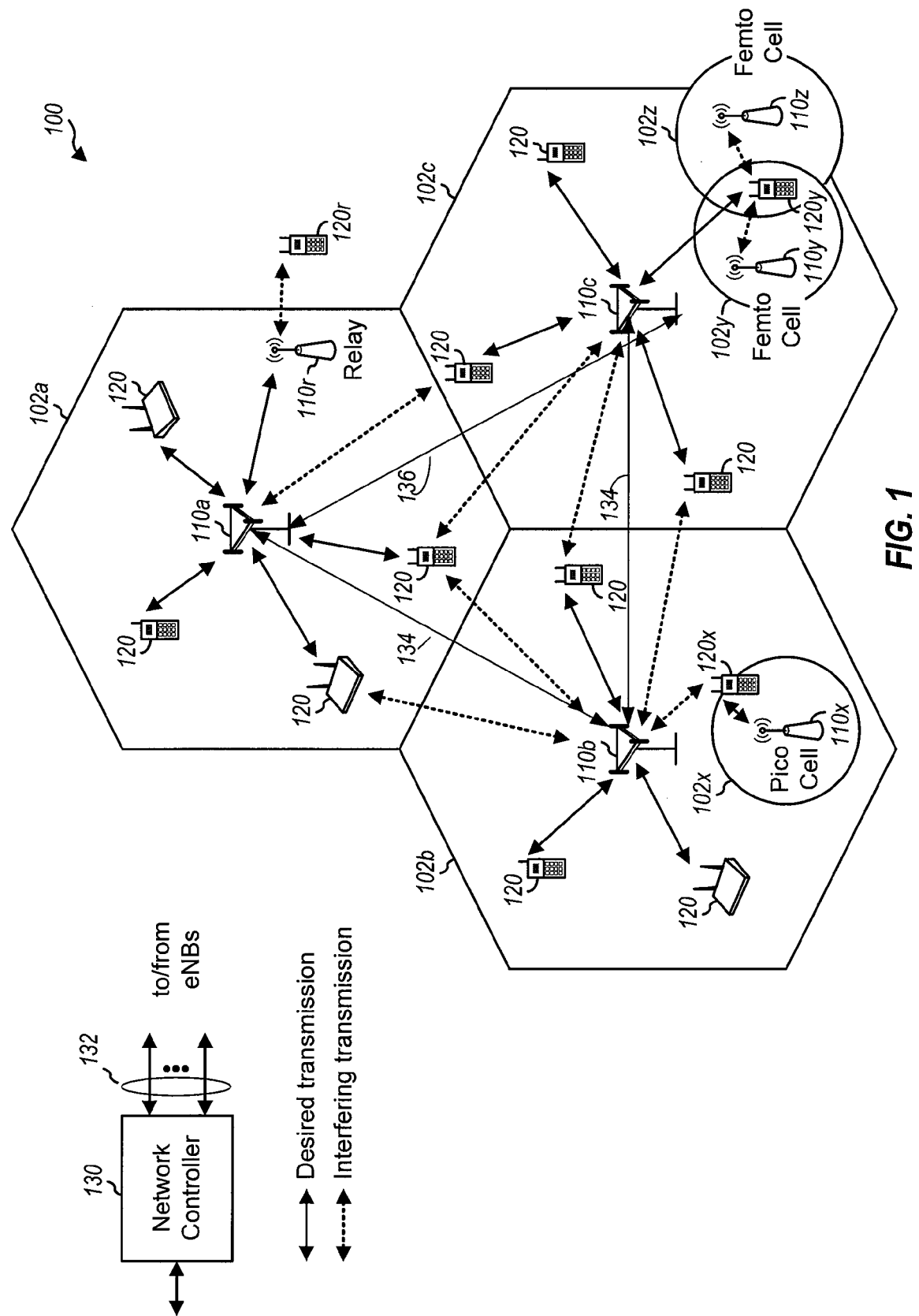
FIG. 1 is a block diagram illustrating an example of a mobile communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The detailed description set forth below, in connection with the drawings, is intended as a description of various configurations and is not intended to limit the scope of the present disclosure. Rather, the detailed description includes specific details for the purpose of providing a thorough understanding of the inventive subject matter. It will be apparent to those skilled in the art that these specific details are not required in all cases and that the scope of the invention is defined by the appended claims. In some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110$a$, 110$b$ and 110$c$ are macro eNBs for the macro cells 102$a$, 102$b$ and 102$c$, respectively. The eNB 110$x$ is a pico eNB for a pico cell 102$x$. And, the eNBs 110$y$ and 110$z$ are femto eNBs for the femto cells 102$y$ and 102$z$, respectively. An eNB may support one or multiple (e.g., two, three, four, and the like) cells.

The wireless network 100 also includes relay stations 110. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110$r$ may communicate with the eNB 110$a$ and a UE 120$r$, in which the relay station 110$r$ acts as a relay between the two network elements (the eNB 110$a$ and the UE 120$r$) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, or 20 MHz, respectively.

Figure 2:
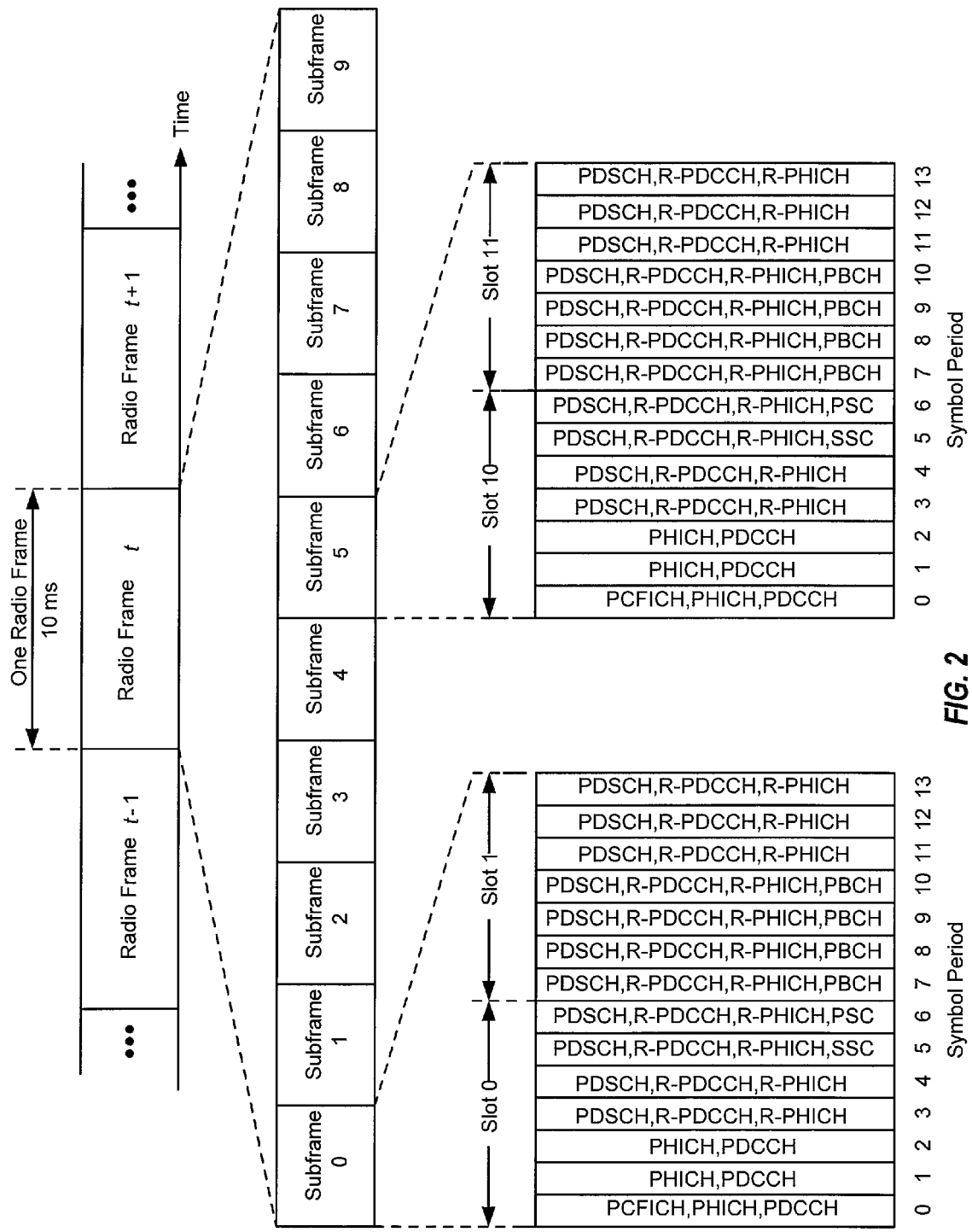
FIG. 2 is a block diagram illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
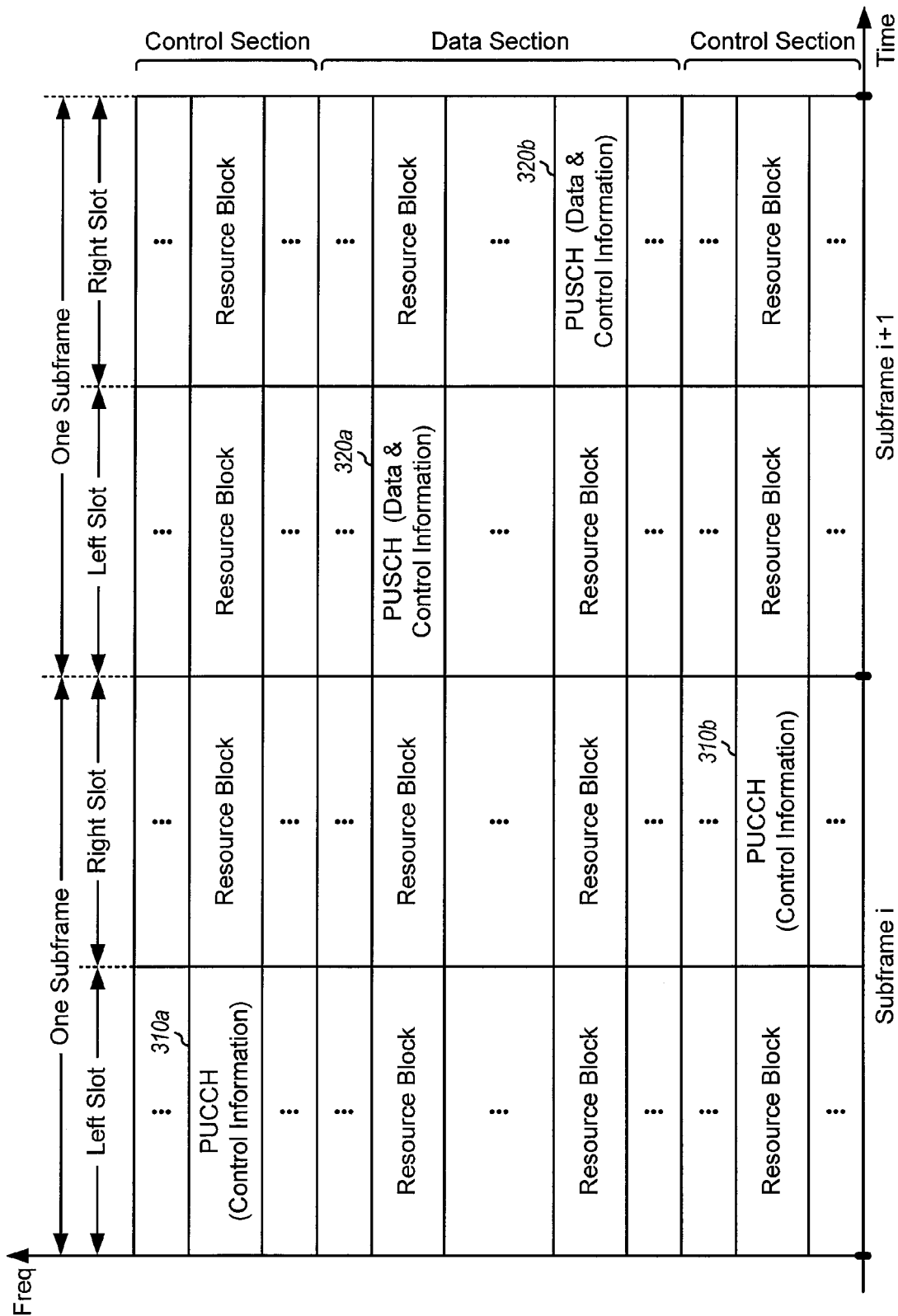
FIG. 3 is a block diagram illustrating an exemplary frame structure in uplink LTE/-A communications.

FIG. 3 is a block diagram conceptually illustrating an exemplary frame structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH)

on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSS, SSS, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
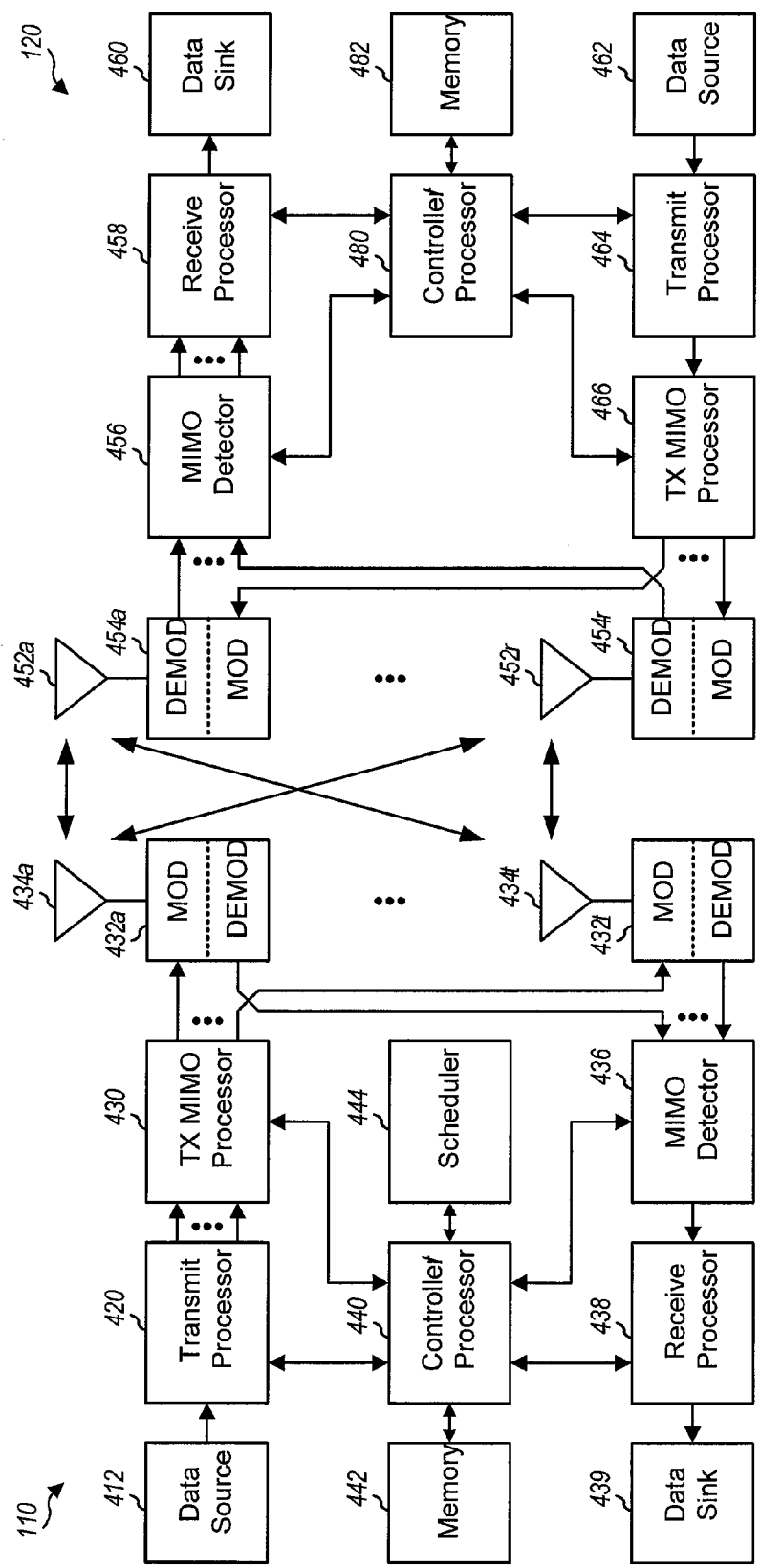
FIG. 4 is a block diagram illustrating time division multiplexed (TDM) partitioning in a heterogeneous network according to one aspect of the disclosure.

FIG. 4 shows a block diagram of a design of a base station/eNB 110 and a UE 120, which may be one of the base stations/eNBs and one of the UEs in FIG. 1. The base station 110 may be the macro eNB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation of base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIG. 5, and/or other processes for the techniques described herein. The memories 442 and 482 may store data and program codes for the base station 110 and the UE 120, respectively. A scheduler 444 may schedule UEs for data transmission on the downlink and/or uplink.

In one configuration, the UE 120 configured for wireless communication includes means for generating a power headroom report (PHR) and transmitting means. In one aspect, the aforementioned means may be the processor(s), the controller/processor 480, the memory 482, transmit processor 464, TX MIMO processor 466, antennas 452a-r, and the modulators 454a-r configured to perform the functions recited by the aforementioned means. In another aspect, the aforementioned means may be a module or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described below may be processors, electronics devices, hardware devices, electronics components, logical circuits, memories, software codes, firmware codes, etc., or any combination thereof.

A UE may periodically provide power headroom reports (PHRs) to inform an eNB of a UE's remaining transmit power in its scheduled configuration. In UEs configured with multiple component carriers, a power headroom report may be defined for each component carrier (CC). The power headroom report may include component carrier-specific reports for the Physical Uplink Control Channel (PUCCH) and the Physical Uplink Shared Channel (PUSCH).

One type of PHR (Type 1) may report headroom as Pcmax-PUSCH power, where Pcmax represents the total current maximum power configured for UE transmission. Another type of PHR (Type 2) may report headroom as Pcmax-PUCCH power-PUSCH power. A Type 1 PHR may be used for a secondary component carrier (SCC). If parallel PUCCH and PUSCH allocation is not supported then a Type 1 PHR may also be used for a primary component carrier (PCC). If parallel PUCCH and PUSCH allocation is supported, and there is PUCCH and PUSCH transmission on the primary component carrier in a particular transmission time interval (TTI), then the primary component carrier may transmit both Type 1 and Type 2 PHRs together. A UE may be allowed to transmit a PHR on any uplink component carrier. For example, a PHR of component carrier 1 may be transmitted on component carrier 2.

Maximum power reduction (MPR) of a UE is taken into account when power headroom is reported. An eNB generally assumes a particular constant maximum power reduction. For example, a minimum performance requirement may be specified which corresponds to a particular maximum power reduction at the UE. In UEs that are configured with multiple component carriers using carrier aggregation (CA), actual power reduction can vary largely depending on the assignment. Therefore, a UE may actually use different power reduction values (PR) (also referred to as power backoff value) in relation to the MPR, which PR values may be smaller than the value assumed by the eNB. This discrepancy may result in a difference between the power available for transmission at the UE and the power that the eNB believes is available.

An eNB may attempt to estimate transmission power on each component carrier based on the power headroom report and maximum power for that component carrier (Pcmax,c), where 'c' represents the index of the component carrier. Such estimates may be accurate if there is no discrepancy between the power reduction assumed by the eNB and the UE. However, if there is a discrepancy between the power reduction value assumed by the eNB and the UE, there will likely be an error in the transmission power estimate and the estimate of the available power headroom.

One potential source of PHR errors can be caused when a UE reduces its transmit power to meet specific absorption rate (SAR) requirements. SAR refers to the energy absorbed by the human body. SAR requirements are prescribed for wireless devices such as cellular phones, tablets, and other types of UEs for example, to limit human exposure to radio frequency (RF) electromagnetic energy radiated from the devices. The SAR requirements depend on the total radiated power from a device but do not depend on the radio access technology (RAT) used by the device (1× voice, EVDO, LTE, etc). In order to meet these requirements, some devices reduce their transmit power before certain transmissions. This reduction of transmit power to meet the SAR requirements is referred to as a "SAR backoff" throughout this document.

The backoff employed to meet the SAR requirements may change dynamically depending on the position or proximity of a device in relation to a user or on a change in transmit power on the active RATs. For example, to comply with SAR requirements, some devices, such as tablet computers and mobile phones, use proximity sensors and reduce the transmit power only when the device is in the close proximity or oriented in a particular manner with respect to the human body. Devices that transmit simultaneously on multiple RATs (e.g 1× voice and EVDO data or 1× voice and LTE data) may also lower power on one of the RATs in order to meet the SAR requirements. Because voice transmission is likely to have higher priority than the data transmission, the device may lower its data transmission power, while maintaining voice transmission power, for example, to implement SAR backoff.

In some RATs, the device accessing the network periodically sends a power headroom report (PHR) to inform the base station how much power it has available for future transmissions. In LTE systems, a PHR may include the Pcmax or Pcmax,c calculated by the mobile device. The base station uses this information to make scheduling decisions. If the PHRs do not take into account the backoff that devices use to meet SAR requirements, the base station may base its scheduling decisions upon inaccurate information. Inaccurate information, for example, may cause a base station to assign an uplink grant that a UE cannot support, which could increase the expected number of HARQ retransmissions and the average delay of packets, for example.

UEs configured according to various aspects of the present disclosure may calculate their maximum power (Pcmax) as a function of two independent values:

$$P_{CMAX} = f(\text{MAX}(\text{MPR} + A\text{-MPR}, P\text{-MPR})) \qquad (1)$$

where MPR is the maximum power reduction allowed to lower its maximum LTE output power in order to meet general requirements on signal quality and out-of-band (OOB) emissions, A-MPR is the additional maximum power reduction allowed for further lowering the UE's maximum LTE output power with certain combinations of E-UTRA bands, channel bandwidth, and transmission bandwidth for which UE must meet more stringent requirements for spectrum emission mask and spurious emissions, and P-MPR is the power management maximum power reduction which takes into account simultaneous transmission on other RATs serviced by the UE, including the SAR backoff. Therefore, in LTE, the UEs' calculation of their maximum output power is based on a function of the maximum between the total LTE transmission power (MPR+A-MPR) and the overall transmission power (P-MPR) as it may relate to specific absorption limitations.

In a multiple carrier implementation of an LTE network, the UEs configured according to the various aspects of the present disclosure also calculate their maximum power (Pcmax,c) as a function of two independent values:

$$P_{CMAX,C} = f(\text{MAX}(\text{MPR}_C + A\text{-MPR}_C, P\text{-MPR}_C)) \qquad (2)$$

where $\text{MPR}_C$ is the maximum power reduction allowed for the particular carrier 'c', $A\text{-MPR}_C$ is the additional maximum power reduction allowed for carrier 'c', and $P\text{-MPR}_C$ is the power management maximum power reduction for carrier 'c'. In the multicarrier implementation, the UEs calculate Pcmax,c for each of their carriers. Depending on whether the mobile devices handle single or multicarrier transmissions, when transmitting a PHR in various aspects of the present disclosure, the mobile devices will send the calculated Pcmax or Pcmax,c, respectively, to their serving eNB. The serving eNBs may use the Pcmax or Pcmax, c to determine, among other things, which MCS to assign in an uplink transmission grant to their associated mobile devices.

Figure 5:
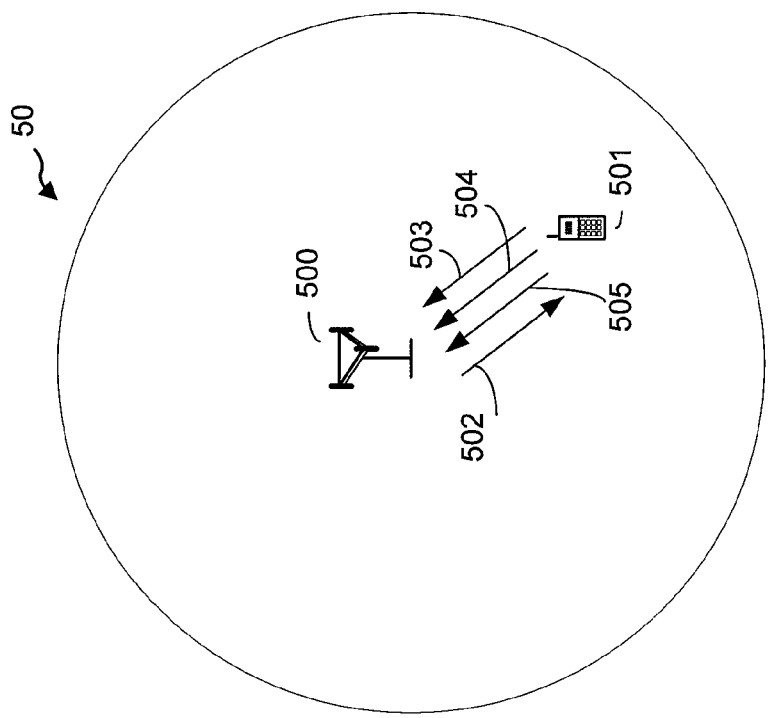
FIG. 5 is a diagram illustrating a mobile device configured according to one aspect of the present disclosure.

FIG. 5 is a diagram illustrating a mobile device 501 configured according to one aspect of the present disclosure. Mobile device 501 is served by eNB 500 within cell 50. During normal signaling, mobile device 501 receives an uplink transmission grant 502 from eNB 500. This uplink grant includes an modulation and coding scheme (MCS) assignment, which designates the particular data rate that the UE 501 should transmit. The eNB 500 determines the particular MCS based, in part, on the power information received from mobile device 501 in a PHR 505 sent from mobile device 501. Using the assigned MCS, the system bandwidth, and the particular transmit bandwidth configuration, the UE 501 may determine the MPR for uplink transmissions. As illustrated in FIG. 5, mobile device 501 is simultaneously transmitting data, though data transmission 503, and transmitting voice, through voice transmission 504. Therefore, prior to adjusting the power based on the determined MPR, the UE 501 determines the applicability of a SAR-related power reduction associated with the specific absorption rate requirements. For example, in an LTE network, the UE 501 would determine the P-MPR that includes accommodation for specific absorption-rate requirements. The SAR-related power reduction value will take into account the total power used by the UE 501 in the simultaneous transmission of data transmission 503 and voice transmission 504.

The UE 501 compares the MPR value and the SAR-related power reduction value. If the MPR value is greater than the SAR-related power reduction value, then the UE 501 will adjust the transmission power within the MPR value. The MPR value is an allowance that provides the maximum adjustment. Thus, the UE 501 may reduce power by any amount up to the MPR value. If the SAR-related power reduction value is greater than the MPR value, then the UE 501 will adjust the uplink transmission power according to that SAR-related power reduction value.

It should be noted that, when the communications system in which cell 50 operates includes multicarrier operation, the UE 501 would determine the MPR and the SAR-related power reduction values for each carrier it uses for transmission. The determination of whether to apply the MPR or the SAR-related power reduction values for adjusting the transmission power would also be performed on a per-carrier basis. Moreover, in a multicarrier implementation, UE 501 may transmit PHR 505 for each carrier and receive assignment information from eNB 500 for each carrier in the uplink transmission grant 502.

Figure 6:
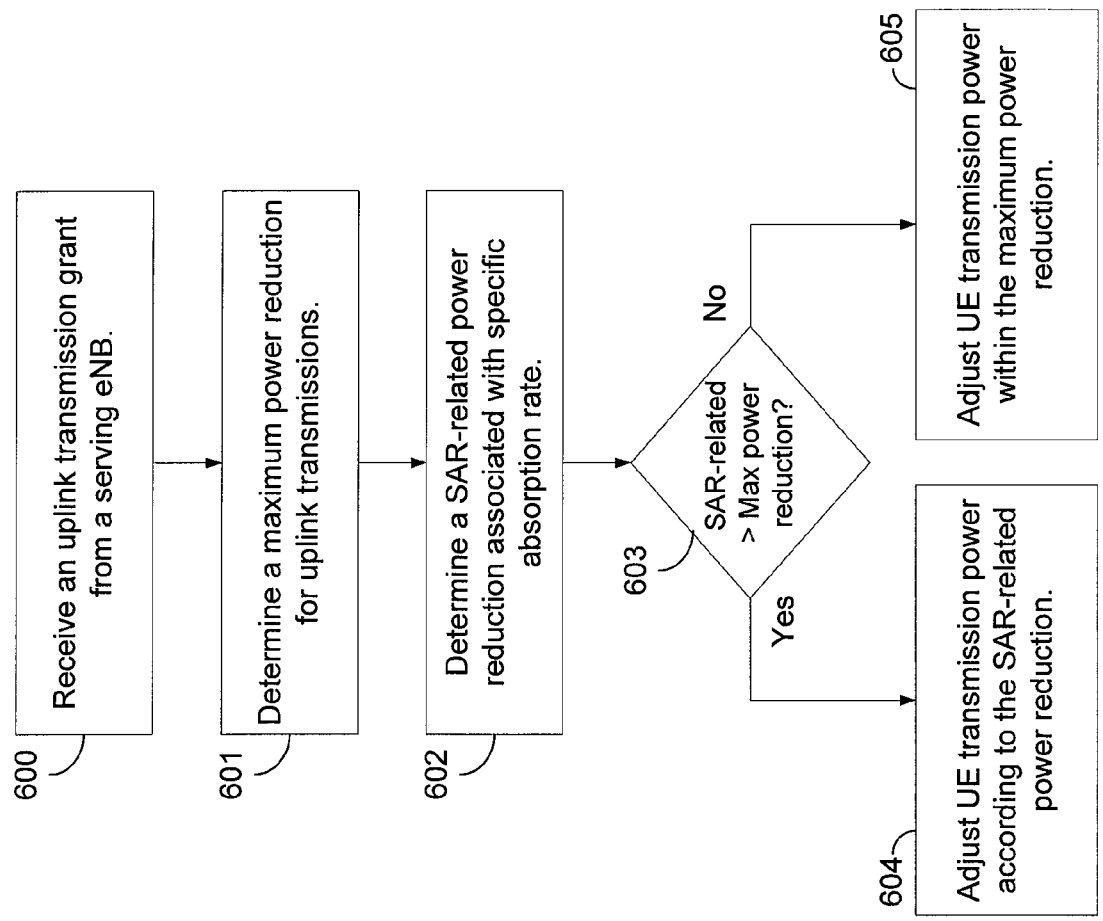
FIG. 6 is a functional block diagram illustrating example blocks executed to implement one aspect of the present disclosure.

FIG. 6 is a functional block diagram illustrating example blocks executed to implement one aspect of the present disclosure. In block 600, the UE receives an uplink transmission grant from a serving eNB. Based in part on information and assignments obtained in the uplink grant, the UE determines a maximum power reduction, in block 601, for uplink transmissions. The maximum power reduction may includes both MPR and A-MPR terms as previously described. The UE also determines a SAR-related power reduction associated with the specific absorption rate requirements for its overall emissions in block 602. A determination is made, in block 603, whether the determined SAR-related power reduction is greater than the maximum power reduction. If so, then, in block 604, the UE adjusts transmission power according to the SAR-related power reduction. Otherwise, if the SAR-related power reduction is not greater than the maximum power reduction, then, in block 605, the UE adjusts the transmission power within the maximum power reduction even where simultaneous transmission is not occurring.

It should be noted that, in determining the SAR-related power reduction, a mobile device may not only account for the total power during simultaneous device uplink transmission, but may also determine its proximity to a user or its orientation with respect to a user. Some mobile devices, such as tablet computers or some mobile phones, include proximity and orientation detectors that will allow the device to determine its proximity to a user or its orientation with respect to the user. Based on these parameters, the mobile device may determine a SAR-related power reduction.

Figure 7B:
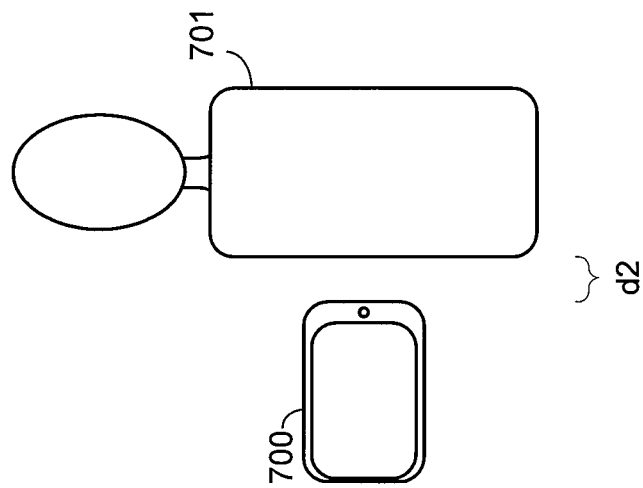
FIGS. 7A-7C are diagrams illustrating a mobile device configured according to one aspect of the present disclosure.
Figure 7A:
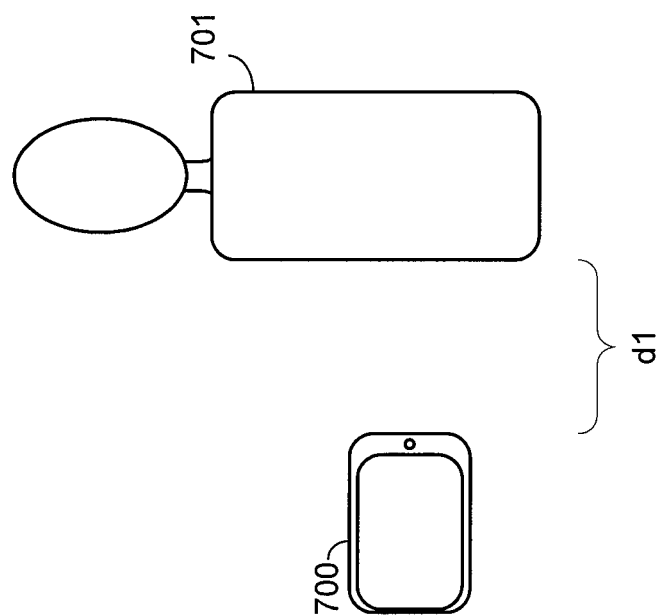
Figure 7C:
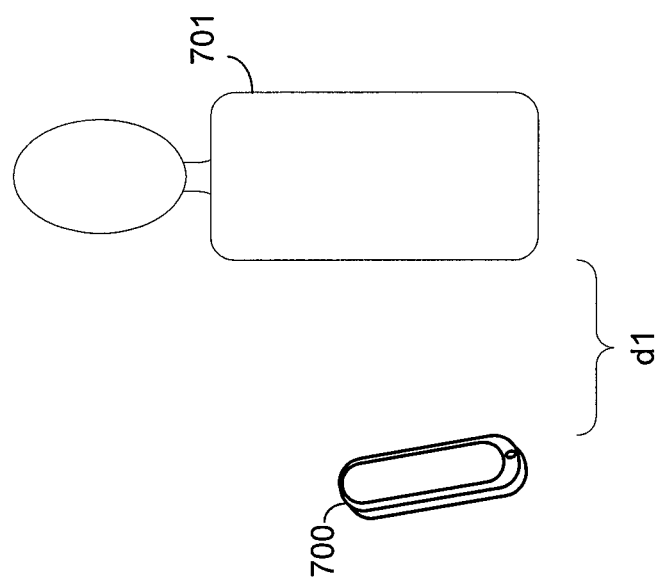

FIGS. 7A-7C are diagrams illustrating a mobile device 700 configured according to one aspect of the present disclosure. Mobile device 700 is illustrated as a tablet computer. Mobile device 700 is in a particular orientation with respect to user 701 and is located at a distance, d1, from user 701. When oriented in the manner illustrated in FIG. 7A, and at the distance, d1, mobile device 700 has no indication that its absorption rate of energy is approaching a SAR limit. Accordingly, without any other operation that implicates the SAR requirements, mobile device 700 would determine no SAR-related power reduction value for uplink transmission, as illustrated in FIG. 7A.

In FIG. 7B, mobile device 700 has been moved closer to user 701. Mobile device 700 is now a distance, d2, from user 701. At this distance and orientation, the rate of energy absorption to the user 701 exceeds the SAR requirements. Thus, mobile device 700 would determine a SAR-related power reduction value for uplink transmission, as illustrated in FIG. 7B.

In FIG. 7C, mobile device 700 has been moved back to a distance, d1, from the user 701. However, its orientation has been changed to face user 701. While the distance, d1, and orientation of mobile device 700 illustrated in FIG. 7A did not trigger determination of a non-zero SAR-related power reduction, by changing the orientation of mobile device 700, which changes the orientation of the antennas of mobile device 700, the energy absorption rate associated with this distance and orientation indicates SAR implications. Accordingly, when the mobile device 700 is changed to the orientation illustrated in FIG. 7C, as detected by its internal proximity and orientation detectors (not shown), it will determine a SAR-related power reduction value for its uplink transmissions.

In order to limit discrepancies in power reduction values between the UE and its serving base station, a PHR can be triggered in order for the base station to be made aware of a change in maximum transmit power allowed at a UE. Various aspects of the present disclosure include conditions for triggering the generation of a PHR, as well as conditions for sending a PHR to the base station. It should be understood that triggering the generation and sending of a PHR may be performed on a per-carrier basis for multi-carrier wireless communication systems, such as carrier aggregation in LTE according to aspects of the present disclosure.

Figure 8:
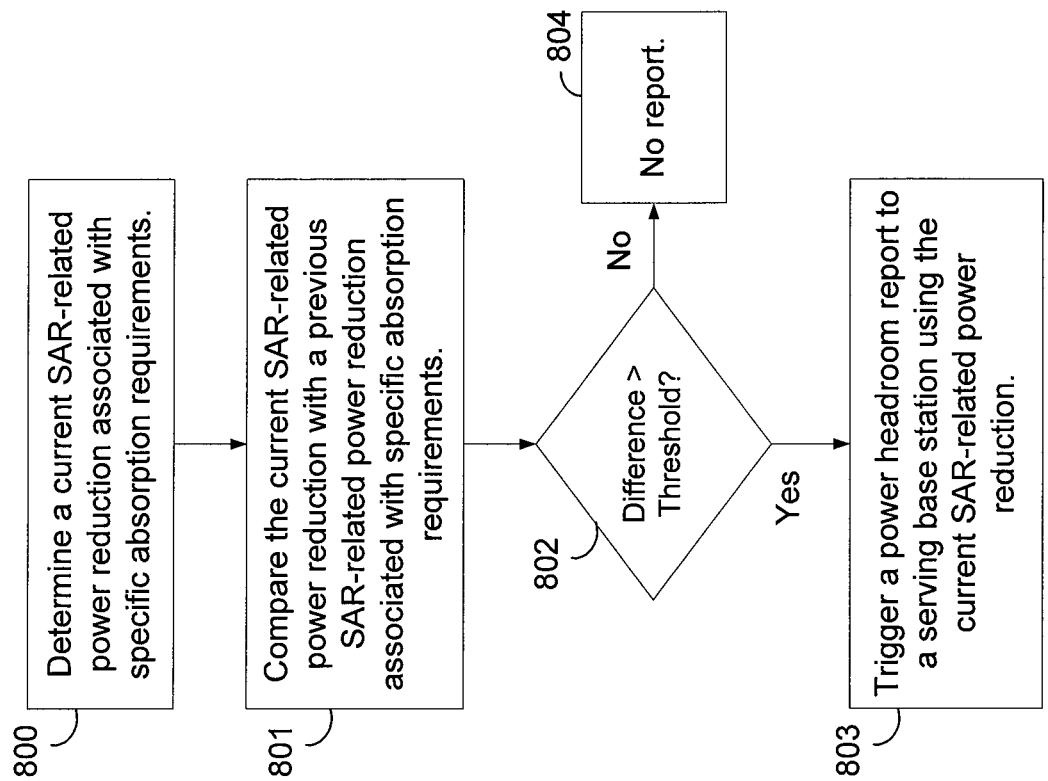
FIG. 8 is a functional block diagram illustrating example blocks executed to implement one aspect of the present disclosure.

FIG. 8 is a functional block diagram illustrating example blocks executed to implement one aspect of the present disclosure. In block 800, a mobile device determines a current SAR-related power reduction value. The mobile device may determine the current SAR-related power reduction value when the SAR backoff changes at the mobile device (e.g., when a simultaneous transmission on another RAT begins or ends, when the proximity or orientation of the mobile device changes with respect to a user, and the like). The mobile device compares the current SAR-related power reduction value to the previous SAR-related power reduction value in block 801. A determination is made, in block 802, whether the difference between the current and previous SAR-related power reduction values is greater than a threshold predetermined by the serving base station. If not, in block 804, no PHR is triggered by the mobile device. If the difference is greater than the predetermined threshold, in block 803, a PHR is triggered by the mobile device to report to the serving base station. The PHR triggered may also include the determined current SAR-related power reduction.

Figure 9:
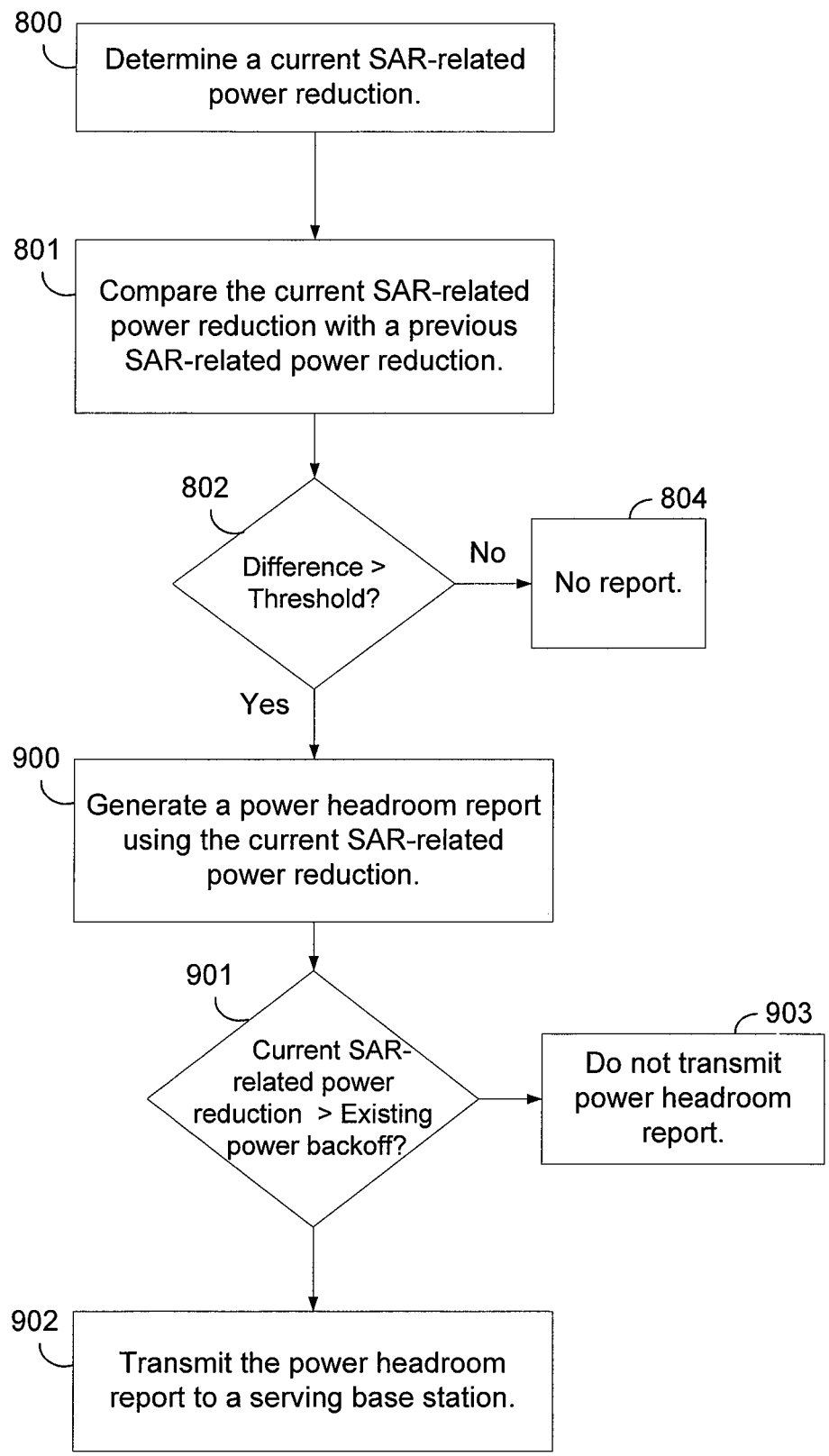
FIG. 9 is a functional block diagram illustrating example blocks executed to implement one aspect of the present disclosure.

To avoid sending an unnecessary PHR, according to the present disclosure, the PHR generated in response to the trigger conditions, as described above with reference to FIG. 8, may be transmitted by a UE when certain additional conditions are satisfied. FIG. 9 is a functional block diagram illustrating example blocks executed to implement one aspect of the present disclosure for triggering a PHR. The initial blocks begin in the same manner as illustrated in blocks 800, 801, 802, and 804 of FIG. 8. When it is determined that the difference between the current and previous SAR-related power reduction values is greater than the predetermined threshold, the mobile device generates the PHR, in block 900, using the current SAR-related power reduction value. The mobile device generates the PHR but does not immediately transmit the PHR to the serving base station. In block 901, another determination is made whether the current SAR-related power reduction is greater than the current power backoff implemented by the mobile device. If the current SAR-related power reduction is not greater than the current power backoff, in block 903, the mobile device does not transmit the PHR. Because the current power backoff is greater than the SAR-related power reduction value, the eNB does not need to adjust its power reduction value associated with that mobile device. If, however, the current SAR-related power reduction is greater than the current power backoff, then, in block 902, the mobile device transmits the PHR to the serving base station. In another aspect, the mobile device executes block 901 when the condition of block 802 is met and generates the PHR only when the current SAR-related power reduction exceeds the existing power backoff.

It should further be noted that, according to another aspect of the present disclosure, the PHR may only be transmitted by a UE when the difference between a current SAR backoff and a standard backoff exceeds a threshold configured by the base station. For example, the standard backoff may not take into account SAR requirements.

Using conditions for transmitting the PHR according to the present disclosure is beneficial because the conditions allows a UE to transmit a PHR to a base station only if the SAR backoff information makes a difference at the base station. For example, if standard backoff is greater than the current SAR backoff, the UE will use PR and not the current SAR backoff. In this case, no extra information is needed at the base station.

According to another aspect of the present disclosure, a separate prohibit timer may be configured by a base station to limit the frequency of PHR reporting. The prohibit timer may be started or restarted when a UE sends a PHR. According to illustrative embodiments, the UE may then be allowed to trigger generation and/or sending of a PHR only if the prohibit timer has expired or is not running.

Figure 10:
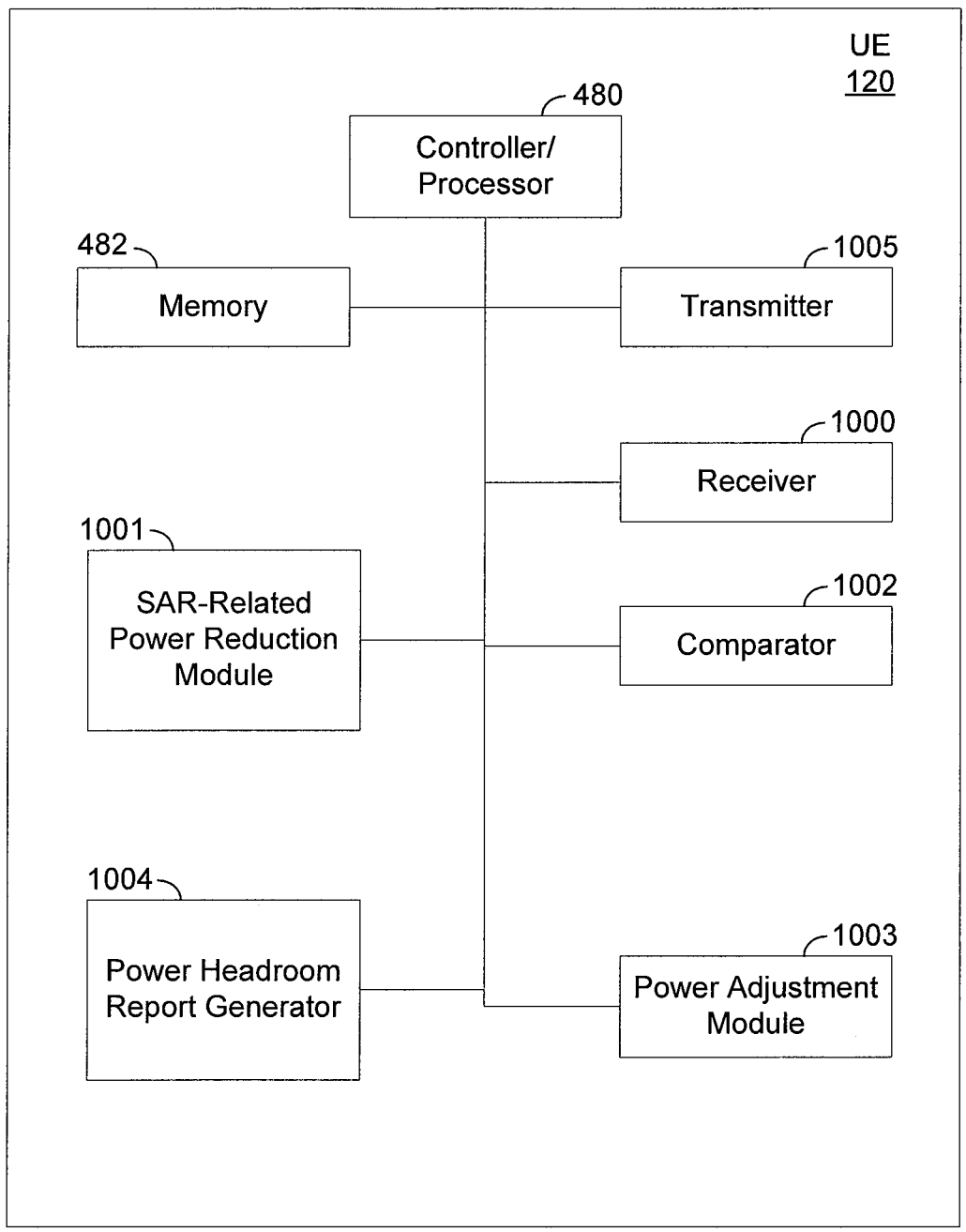
FIG. 10 is a block diagram illustrating a UE configured according to one aspect of the present disclosure.

FIG. 10 is a block diagram illustrating a UE 120 configured according to one aspect of the present disclosure. The UE 120 includes a controller/processor 480. Controller/processor 480 controls, manages, and operates all of the functionality of UE 120. The UE 120 also includes a receiver 1000. The receiver 1000 may include such components as antennas 452*a-r*, demodulators 454*a*-4, MIMO detector 456, and receive processor 458, as illustrated in FIG. 4. Receiver 1000 operates under control of controller/processor 480 to provide means for receiving an uplink transmission grant from a serving base station. Using the MCS assigned to the UE 120 in the uplink transmission grant, the controller/processor 480 accesses a table of maximum power reduction values within memory 482 to provide means for determining a maximum power reduction for uplink transmissions at UE 120. A SAR-related power reduction module 1001, under control of controller/processor 480, provides means for determining a SAR-related power reduction value. The SAR-related power reduction module 1001 will take into account the orientation and proximity of the device or the total power used during simultaneous transmissions The controller/processor 480 controls a comparator 1002 to provide means for comparing the maximum power reduction with the SAR-related power reduction. A power adjustment module 1003 within UE 120 and under control of controller/processor 480 operates to provide means for adjusting transmission power according to the SAR-related power reduction in response to the comparator 1002 finding that the SAR-related power reduction value exceeds the maximum power reduction.

For its reporting functionality, the controller/processor 480 accesses memory 482 to retrieve a previous SAR-related power reduction and controls comparator 1002 to provide means for comparing the determined SAR-related power reduction to a previous SAR-related power reduction. A power headroom report generator 1004 is operated, under control of the controller/processor 480, to provide means for generating a power headroom report when the determined SAR-related power reduction exceeds the previous SAR-related power reduction. A transmitter 1005, under control of the controller/processor 480, provides means for transmitting the power headroom report from the mobile device to the serving base station. The transmitter 1005 may include components such as transmit processor 464, TX MIMO processor 466, modulators 454*a-r*, and antennas 452*a*-4, as illustrated in FIG. 4.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving an uplink transmission grant from a serving base station;
   determining a maximum power reduction for uplink transmissions at a mobile device;
   determining a specific absorption rate (SAR)-related power reduction;
   comparing the maximum power reduction with the SAR-related power reduction; and
   adjusting transmission power according to the SAR-related power reduction in response to the SAR-related power reduction exceeding the maximum power reduction.

2. The method of claim 1, wherein the uplink transmission grant includes a modulation and coding scheme (MCS) assignment, wherein the determining the maximum power reduction further comprises:
   looking up a maximum power reduction in a table based, at least in part, on the MCS assignment.

3. The method of claim 1, wherein the determining the SAR-related power reduction is determined based on one of: a state of simultaneous transmission of the mobile device and a proximity of the mobile device to a user.

4. The method of claim 3, wherein the proximity comprises one or more of: a distance between the mobile device and the user, and an orientation of the mobile device with respect to the user.

5. The method of claim 1, further comprising:
   comparing the determined SAR-related power reduction to a previous SAR-related power reduction; and
   generating a power headroom report when the determined SAR-related power reduction exceeds the previous SAR-related power reduction.

6. The method of claim 5, wherein the generating is triggered when the determined SAR-related power reduction exceeds the previous SAR-related power reduction by at least a predetermined threshold.

7. The method of claim 5, further comprising:
   transmitting the power headroom report from the mobile device to the serving base station in response to one of:
   the determined SAR-related power reduction exceeding the previous SAR-related power reduction; and
   the determined SAR-related power reduction exceeding an actual standard backoff employed by the mobile device.

8. The method of claim 5, wherein the comparing the determined SAR-related power reduction to a previous SAR-related power reduction and the generating are performed for each carrier of a plurality of component carriers through which the mobile device transmits.

9. The method of claim 1, wherein the determining the maximum power reduction, the determining the SAR-related power reduction, the comparing, and the adjusting are performed for each carrier of a plurality of component carriers through which the mobile device transmits.

10. An apparatus configured for wireless communication, comprising:
    means for receiving an uplink transmission grant from a serving base station;
    means for determining a maximum power reduction for uplink transmissions at a mobile device;
    means for determining a specific absorption rate (SAR)-related power reduction;
    means for comparing the maximum power reduction with the SAR-related power reduction; and
    means for adjusting transmission power according to the SAR-related power reduction in response to the SAR-related power reduction exceeding the maximum power reduction.

11. The apparatus of claim 10, wherein the uplink transmission grant includes a modulation and coding scheme (MCS) assignment, wherein the means for determining the maximum power reduction further comprises:
    means for looking up a maximum power reduction in a table based, at least in part, on the MCS assignment.

12. The apparatus of claim 10, wherein the means for determining the SAR-related power reduction is determined based on one of: a state of simultaneous transmission of the mobile device and a proximity of the mobile device to a user.

13. The apparatus of claim 12, wherein the proximity comprises one or more of: a distance between the mobile device and the user, and an orientation of the mobile device with respect to the user.

14. The apparatus of claim 10, further comprising:
    means for comparing the determined SAR-related power reduction to a previous SAR-related power reduction; and
    means for generating a power headroom report when the determined SAR-related power reduction exceeds the previous SAR-related power reduction.

15. The apparatus of claim 14, wherein the means for generating is triggered when the determined SAR-related power reduction exceeds the previous SAR-related power reduction by at least a predetermined threshold.

16. The apparatus of claim 14, further comprising:
    means for transmitting the power headroom report from the mobile device to the serving base station in response to one of:
    the determined SAR-related power reduction exceeding the previous SAR-related power reduction; and the determined SAR-related power reduction exceeding an actual standard backoff employed by the mobile device.

17. The apparatus of claim 14, wherein the means for comparing the determined SAR-related power reduction to a previous SAR-related power reduction and the means for generating are performed for each carrier of a plurality of component carriers through which the mobile device transmits.

18. The apparatus of claim 10, wherein the means for determining the maximum power reduction, the means for determining the SAR-related power reduction, the means for comparing, and the means for adjusting are performed for each carrier of a plurality of component carriers through which the mobile device transmits.

19. A computer program product for wireless communications in a wireless network, comprising:
a non-transient computer-readable medium having program code recorded thereon, the program code comprising:
program code to receive an uplink transmission grant from a serving base station;
program code to determine a maximum power reduction for uplink transmissions at a mobile device;
program code to determine a specific absorption rate (SAR)-related power reduction;
program code to compare the maximum power reduction with the SAR-related power reduction; and
program code to adjust transmission power according to the SAR-related power reduction in response to the SAR-related power reduction exceeding the maximum power reduction.

20. The computer program product of claim 19, wherein the uplink transmission grant includes a modulation and coding scheme (MCS) assignment, wherein the program code to determine the maximum power reduction further comprises:
program code to look up a maximum power reduction in a table based, at least in part, on the MCS assignment.

21. The computer program product of claim 19, wherein the program code to determine the SAR-related power reduction is executed based on one of: a state of simultaneous transmission of the mobile device and a proximity of the mobile device to a user.

22. The computer program product of claim 21, wherein the proximity comprises one or more of: a distance between the mobile device and the user, and an orientation of the mobile device with respect to the user.

23. The computer program product of claim 19, further comprising:
program code to compare the determined SAR-related power reduction to a previous SAR-related power reduction; and
program code to generate a power headroom report when the determined SAR-related power reduction exceeds the previous SAR-related power reduction.

24. The computer program product of claim 23, wherein the program code to generate is executed when the determined SAR-related power reduction exceeds the previous SAR-related power reduction by at least a predetermined threshold.

25. The computer program product of claim 23, further comprising:
program code to transmit the power headroom report from the mobile device to the serving base station in response to one of:
the determined SAR-related power reduction exceeding the previous SAR-related power reduction; and
the determined SAR-related power reduction exceeding an actual standard backoff employed by the mobile device.

26. The computer program product of claim 23, wherein the program code to compare the determined SAR-related power reduction to a previous SAR-related power reduction and the program code to generate are executed for each carrier of a plurality of component carriers through which the mobile device transmits.

27. The computer program product of claim 19, wherein the program code to determine the maximum power reduction, the program code to determine the SAR-related power reduction, the program code to compare, and the program code to adjust are executed for each carrier of a plurality of component carriers through which the mobile device transmits.

28. An apparatus configured for wireless communication, comprising:
at least one processor; and
a memory coupled to the at least one processor,
wherein the at least one processor is configured:
to receive an uplink transmission grant from a serving base station;
to determine a maximum power reduction for uplink transmissions at a mobile device;
to determine a specific absorption rate (SAR)-related power reduction;
to compare the maximum power reduction with the SAR-related power reduction; and
to adjust transmission power according to the SAR-related power reduction in response to the SAR-related power reduction exceeding the maximum power reduction.

29. The apparatus of claim 28, wherein the uplink transmission grant includes a modulation and coding scheme (MCS) assignment, wherein the configuration of the at least one processor to determine the maximum power reduction further comprises configuration of the at least one processor to look up a maximum power reduction in a table based, at least in part, on the MCS assignment.

30. The apparatus of claim 28, wherein the configuration of the at least one processor to determine the SAR-related power reduction is implemented based on one of: a state of simultaneous transmission of the mobile device and a proximity of the mobile device to a user.

31. The apparatus of claim 30, wherein the proximity comprises one or more of: a distance between the mobile device and the user, and an orientation of the mobile device with respect to the user.

32. The apparatus of claim 28, wherein the at least one processor is further configured:
to compare the determined SAR-related power reduction to a previous SAR-related power reduction; and
to generate a power headroom report when the determined SAR-related power reduction exceeds the previous SAR-related power reduction.

33. The apparatus of claim 32, wherein the configuration of the at least one processor to generate is performed when the determined SAR-related power reduction exceeds the previous SAR-related power reduction by at least a predetermined threshold.

34. The apparatus of claim 32, wherein the at least one processor is further configured:
to transmit the power headroom report from the mobile device to the serving base station in response to one of:
the determined SAR-related power reduction exceeding the previous SAR-related power reduction; and the determined SAR-related power reduction exceeding an actual standard backoff employed by the mobile device.

35. The apparatus of claim 32, wherein the configuration of the at least one processor to compare the determined SAR-related power reduction to a previous SAR-related power reduction and to generate are performed for each carrier of a plurality of component carriers through which the mobile device transmits.

36. The apparatus of claim 28, wherein the configuration of the at least one processor to determine the maximum power reduction, to determine the SAR-related power reduction, to compare, and to adjust are performed for each carrier of a plurality of component carriers through which the mobile device transmits.

* * * * *